United States Patent Office 3,810,825
Patented May 14, 1974

3,810,825
RESIN AND PROCESS FOR CURING BY EXPOSING TO IONIZING RADIATION A MIXTURE OF A VINYL ESTER RESIN, AN ALKENYL AROMATIC MONOMER AND A 2-OXAZOLINE OR GUANIDINE
Inder Mani, Midland, Mich., assignor to The Dow Chemical Company, Midland, Mich.
No Drawing. Filed May 13, 1971, Ser. No. 143,266
Int. Cl. B01j *1/10, 1/12*
U.S. Cl. 204—159.15
12 Claims

ABSTRACT OF THE DISCLOSURE

The addition of at least about 0.3 weight percent of a 2-oxazoline, a guanidine or certain amines to a thermosettable mixture of an alkenyl aromatic monomer and a polymerizable vinyl ester resin reduces the dosage level of ionizing radiation required to cure the mixture.

BACKGROUND OF THE INVENTION

This invention relates to the field of ionizing radiation cure of polymerizable materials and to coatings of same and especially relates to a promoter to reduce the ionizing radiation level or dosage necessary to effect a cure of said materials.

From a commercial standpoint radiation curing offers a number of advantages over thermal catalyst-initiated cures: immediate initiation of polymerization, extended pot-life of the curable materials, little temperature rise so heat sensitive substrates may be employed in coatings, better control of the polymerization reaction, superior substrate-coating bonds are produced and much higher concentrations of radicals may be produced instantaneously. However, these advantages are difficult to realize if the curable materials require high curing doses of ionizing radiation since the economics become prohibitive. Commercialization then depends on reducing the cost of the curing process by finding methods and materials to effect a cure at lower dosages.

The search for means to accelerate or promote radiation curing is evident by a number of patents relating to certain polymerizable materials. While neither the promoters or the polymerizable materials employed correspond in any way to this invention, patents representative of such efforts include U.S. 3,202,513; 3,251,759; 3,265,604; 3,352,771 and 2,979,446. Commercially it is desirable to be able to cure at dosages of no more than 2 to 3 megarads but it would be of great advantage to be able to cure at 1 megarad or even less.

SUMMARY OF THE INVENTION

According to this invention the curing dosage of ionizing radiation required to cure in an inert atmosphere a mixture of an alkenyl aromatic monomer and a polymerizable vinyl ester resin is reduced by adding to the mixture at least 0.3 weight percent of certain nitrogen containing materials.

The vinyl ester resin is prepared by reacting about equivalent amounts of a polyepoxide of a polyhydric alcohol having more than one epoxide group per molecule with a dicarboxylic acid half ester having the formula

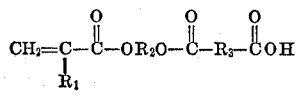

wherein $R_1$ is hydrogen or an alkyl group of 1 to 4 carbons. $R_2$ is an alkylene group of 2 to 6 carbons and $R_3$ is phenylene, cyclohexylene, alkylene or an unsaturated bivalent hydrocarbon radical. The nitrogen materials include various 2-oxazolines, guanidines and certain amines which are more fully described hereafter.

DESCRIPTION OF THE INVENTION

The general methods by which vinyl ester resins may be prepared are thoroughly described in the patent literature. Representative patents which describe the resins and their preparation include U.S. 3,066,112; U.S. 3,179,623; U.S. 3,256,226; U.S. 3,301,743 and U.S. 3,377,406.

In particular the vinyl ester resins employed in this invention are described in U.S. 3,367,992 along with methods for their preparation. More particularly this invention relates to said resins prepared from polyepoxides of polyhydric alcohols having more than one epoxide group per molecule.

The vinyl ester resins are prepared by reaction of about equivalent amounts of said polyepoxide of a polyhydric alcohol and a dicarboxylic acid half ester having the formula

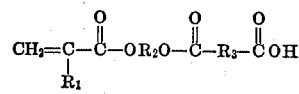

where $R_1$ is hydrogen or an alkyl group of 1 to 4 carbons, $R_2$ is an alkylene group of 2 to 6 carbons and $R_3$ is phenylene, cyclohexylene, alkylene or an unsaturated bivalent hydrocarbon radical.

Said half esters are conveniently prepared by esterification of a hydroxyalkyl acrylate or methacrylate with an equal molar amount of a dicarboxylic acid, or preferably a dicarboxylic acid anhydride where it exists. For example, equal molar amounts of 2-hydroxyethyl acrylate and maleic anhydride may be reacted to form said half ester. Accordingly $R_1$ in the formula is usually hydrogen or methyl. In place of 2-hydroxyethyl acrylate one may employ hydroxypropyl or hydroxybutyl acrylate or methacrylate. Also, in place of maleic anhydride or maleic acid one may employ fumaric acid, itaconic acid, citraconic acid, adipic acid, the isomeric phthalic acids and the like. The anhydrides of said acids, where available, may also be used.

Said half ester is reacted with a polyepoxide of a polyhydric alcohol having more than one epoxide group per molecule. Typical polyhydric alcohols include aliphatic diols (glycols) and the polyalkylene glycols such as ethylene glycol, diethylene glycol, triethylene glycol, higher polyethylene glycols, the analogous propylene glycols and higher polypropylene glycols, 1,4-butane diol, 1,5-pentane diol, neopentyl glycol, glycerol, pentaerythritol and the like.

Various catalysts may be used in the preparation of vinyl ester resins. Catalysts include tertiary amines such as tris(dimethylaminomethyl)phenol, onium catalysts, triphenyl stibine and triphenyl phosphine and the like. Usually hydroquinone or other like polymerization inhibitors are added to prevent polymerization during the preparation of the resin.

The vinyl ester resin is then mixed with an alkenyl aromatic monomer which includes such monomers as styrene, vinyl toluene, halogenated styrenes such as o-chlorostyrene, vinyl naphthalene, divinyl benzene and the like.

The polymerizable materials of this invention are especially useful in coating various substrates such as metal, wood and the like either as a primer coating and/or a finished coating. In order to obtain the benefits of this invention at least about 0.3 weight percent of the nitrogen containing material is added to the resin/monomer mixture. Preferably the amount ranges from about 0.3 to 10 weight percent and most preferably from about 1.5 to 5 weight percent.

When employed as coating formulations other additives may be incorporated into the coating, for example, various inert fillers and pigments such as kaolin clay, titanium dioxide, silica, various inorganic oxides and the like. Films cast from the coating formulations may be rapidly cured by exposing them in an inert atmosphere to ionizing radiation (accelerated particulate radiation). A beam intensity of at least 50 microamperes is usually employed, but this invention is not limited thereto and lower beam intensities may be employed.

Generally the films or coatings will range in thickness from about 0.1 mil up to about 10 mils. However, depending on the accelerating voltage, thicknesses up to 250 mils or higher are feasible. The radiation curing step should be performed in an inert atmosphere. By this it is meant an atmosphere which is essentially free of oxygen since the presence of oxygen may result in an undesirable tacky surface. It is sufficient for this purpose to place a thin film of a plastic material such as a polyester (Mylar) film on the cast film or coating. Other means may be used such as curing in a chamber containing an essentially oxygen free atmosphere such as nitrogen, helium, argon and the like.

Accelerated particulate (ionizing) radiation includes particles such as electrons, protons, deutrons, other ions and the like. However, from an industrial standpoint, the cost and availability of machines limit ionizing radiation curing to accelerated electrons for the immediate future. A variety of devices are available to provide accelerated electron radiation or varying voltages and beam intensities. Typical of such devices is the familiar Van de Graaff accelerator. Similar commercial accelerators utilizing various acceleration means are available from Texas Nuclear Corporation (cascade rectified system), High Voltage Engineering (insulated core transformer system), General Electric (a resonant transformer design) and Radiation Dynamics, Inc. (radio frequency cascade rectifier system).

Nitrogen containing materials include 2-oxazolines, guanidines and certain amines. Typical of the 2-oxazolines are 2-oxazoline itself, and substituted 2-oxazolines having the formula

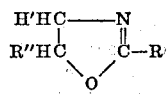

wherein R' and R'' may be hydogen, methyl, ethyl, phenyl and the like. R may be an alkyl, aryl, aralkyl group or H. Such substituted oxazolines include 2-methyl-2-oxazoline; 2,5-diphenyl-2-oxazoline; 2-phenyl, 5-methyl-2-oxazoline; 2-methyl, 5-phenyl-2-oxazoline and the like. Also included within the term 2-oxazolines are the bis oxazolines such as 2,2'-tetramethylene bis(2-oxazoline); 2,2'-oxydiethylene bis(2-oxazoline); 2,2'-thiodiethylene bis(2-oxazoline) and the like. Guanidines include guanidine, tetramethyl guanidine and the like.

Amines which may be employed have the formula $R_1R_2R_3N$ wherein $R_1$ may be an alkyl or an aralkyl group, $R_2$ and $R_3$ each may be hydrogen or an alkyl group or $R_1$ and $R_2$ together may be a cyclic alkylene radical or an oxydialkylene radical. Alkyl groups include methyl, ethyl, propyl, n-butyl, isobutyl and higher alkyl groups. Typical amines include mono-, di- and tri-n-butyl amine, di-isobutyl amine, triethyl amine, cyclohexylamine, benzyl amine, morpholine, piperidine and the like.

The following non-limiting examples will further illustrate the invention. All parts and percentages are by weight unless otherwise specified.

EXAMPLE 1

A vinyl ester resin was prepared by reacting 2-hydroxypropyl acrylate (37.5%) with maleic anhydride (34.3%) to form a helf ester which was subsequently reacted with 1,4-butanediol diglycidyl ether (28.2%) according to the procedure of U.S. 3,367,992. The resin was then mixed with styrene (2 parts/1 part). To the mixture was then added 3% of a nitrogen-containing compound.

A film was cast with a .7 mil drawdown bar on a Q-panel (4" x 12" x .03") and covered with a 2 mil sheet of Mylar (polyester) film to exclude air. The coated polished steel Q-panel was then passed through a 2 mev. electron beam from a Van de Graaff accelerator filtered with 0.33 gm./cm.$^2$ Al. A 50 microampere beam current and a conveyor speed of 3.4 cm./sec. delivered a dose of 0.1 megarad (mrad) for each pass through the beam.

The curing does in megarads (mrad) for each of three different nitrogen compounds is shown below.

| Nitrogen compound: | Curing dose, mrad |
|---|---|
| None | 2.8–3.0 |
| Di-n-butyl amine | 1.4 |
| Tetramethyl guanidine | 1.3–1.4 |
| 2-oxazoline | 1.5–1.6 |

At least about 0.3% of the nitrogen compound is necessary and a minimum curing dose is found at about 1.5 to 5 weight percent. No advantage is found with amounts above 10%.

EXAMPLE 2

Another vinyl ester resin was prepared by reacting about equal molar quantities of 2-hydroxyethyl acrylate and maleic anhydride to form a half ester. The half ester is then reacted with the diglycidyl ether of neopentyl glycol to form a vinyl ester resin.

A series of resin monomer mixtures was prepared with the following monomers in 2/1 weight proportions of resin/monomer.

Resin A—styrene
Resin B—vinyl toluene
Resin C—chlorostyrene (mixture of ortho and para isomers)
Resin D—divinyl benzene (contained 44% ethyl vinyl benzene).

Each of the resins was then mixed with various nitrogen compounds and tested according to the procedure of the previous example.

| Nitrogen compound (3%) | Curing dose, mrad | | | |
|---|---|---|---|---|
| | Resin A | Resin B | Resin C | Resin D |
| None | 2.4 | 2.0–2.1 | 2.0 | 6.5 |
| Di-n-butyl amine | 1.4–1.5 | 1.1 | 1.1 | 3.25 |
| Triethylamine | 1.4–1.5 | 1.1 | 1.1 | 3.25 |
| Piperidine | 1.4–1.5 | 1.1 | 1.1 | 2.75–3.0 |
| Morpholine | 1.5 | 1.1 | 1.1 | 3.25 |
| Benzylamine | 1.5 | 1.2 | 1.3 | 3.25–3.5 |
| 2,2'-tetramethylene bis(2-oxazoline) | 1.4–1.5 | 1.2–1.3 | 1.3 | 3.75–4.0 |
| Tetramethyl guanidine | 1.5 | 1.2 | 1.3 | 3.25–3.5 |

It will be understood that the present invention is not limited to the specific details described above but may embody various modifications insofar as they are defined in the following claims.

What is claimed is:

1. A process for curing a mixture of an alkenyl aromatic monomer and a polymerizable vinyl ester resin, said process comprises exposing said mixture in an inert atmosphere to ionizing radiation in the presence of at least about 0.3 weight percent based on the weight of the mixture of a nitrogen-containing compound selected from the group consisting of 2-oxazolines and guanidines; and wherein said vinyl ester resin is prepared by reacting about equivalent amounts of a polyepoxide of a polyhydric alcohol having more than one epoxide group per molecule with a dicarboxylic acid half ester having the formula

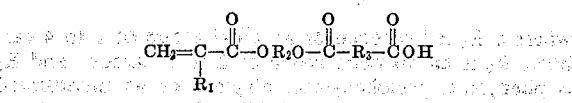

where $R_1$ is hydrogen or an alkyl group of 1 to 4 carbons, $R_2$ is an alkylene group of 2 to 6 carbons and $R_3$ is phenylene, cyclohexylene, alkylene or an unsaturated bivalent hydrocarbon radical.

2. The process of claim 1 wherein said nitrogen compound is present in about 0.3 to 10 weight percent.

3. The process of claim 1 wherein said nitrogen compound is present in about 1.5 to 5 weight percent.

4. The process of claim 1 wherein said nitrogen compound is guanidine or tetramethyl guanidine.

5. The process of claim 1 wherein said nitrogen compound has the formula

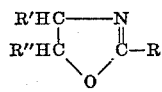

wherein R' and R'' may be hydrogen, phenyl, ethyl or methyl and R may be hydrogen, an alkyl group, an aryl group or an aralkyl group.

6. The process of claim 1 wherein said 2-oxazoline is 2,2'-tetramethylene bis(2-oxazoline), 2,2'-oxydiethylene bis(2-oxazoline) or 2,2'-thiodiethylene bis(2-oxazoline).

7. A thermosettable mixture suitable for curing by exposure to low levels of ionization radiation comprising a mixture of an alkenyl aromatic monomer and a polymerizable vinyl ester resin, said mixture containing at least about 0.3 weight percent based on the weight of the mixture of a nitrogen containing compound selected from the group consisting of 2-oxazolines and guanidines; and wherein said vinyl ester resin is prepared by reacting about equivalent amounts of a polyepoxide of a polyhydric alcohol having more than one epoxide group per molecule with a dicarboxylic acid half ester having the formula

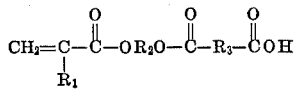

where $R_1$ is hydrogen or an alkyl group of 1 to 4 carbons, $R_2$ is an alkylene group of 2 to 6 carbons and $R_3$ is phenylene, cyclohexylene, alkylene or an unsaturated bivalent hydrocarbon radical.

8. The mixture of claim 7 wherein said nitrogen compound is present in about 0.3 to 10 weight percent.

9. The mixture of claim 7 wherein said nitrogen compound is present in about 1.5 to 5 weight percent.

10. The mixture of claim 7 wherein said nitrogen compound is guanidine or tetramethyl guanidine.

11. The mixture of claim 7 wherein said nitrogen compound has the formula

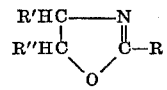

wherein R' and R'' may be hydrogen, phenyl, ethyl or methyl and R may be hydrogen, an alkyl group, an aryl group or an aralkyl group.

12. The mixture of claim 7 wherein said 2-oxazoline is 2,2'-tetramethylene bis(2-oxazoline), 2,2' - oxydiethylene bis(2-oxazoline) or 2,2'-thiodiethylene bis(2-oxazoline).

References Cited

UNITED STATES PATENTS

| | | | |
|---|---|---|---|
| 2,921,006 | 1/1960 | Schnitz et al. | 204—159.15 |
| 3,660,217 | 5/1972 | Kehr | 204—159.22 |
| 3,650,669 | 3/1972 | Osborn et al. | 204—159.22 |
| 2,673,151 | 3/1954 | Gerhart | 95—7 |

FOREIGN PATENTS 1,087,403  10/1967  Great Britain.

MURRAY TILLMAN, Primary Examiner

R. B. TURER, Assistant Examiner

U.S. Cl. X.R.

117—93.31, 132 B, 132 BE, 161 ZB, 161 UZ; 204—159.16, 159.22, 159.23; 260—41 A, 41B, 836, 837 R